United States Patent [19]

Quardt et al.

[11] Patent Number: 5,434,931
[45] Date of Patent: Jul. 18, 1995

[54] SYSTEM AND METHOD FOR PICTURE IMAGE PROCESSING EMPLOYING TRANSFORMATION OF PICTURE DATA

[75] Inventors: Dennis Quardt, Parsippany; Keith S. Reid-Green, Pennington, both of N.J.

[73] Assignee: Educational Testing Service, Princeton, N.J.

[21] Appl. No.: 230,882

[22] Filed: Apr. 20, 1994

Related U.S. Application Data

[63] Continuation of Ser. No. 52,235, Apr. 23, 1993, abandoned, which is a continuation of Ser. No. 728,970, Jul. 12, 1991, abandoned.

[51] Int. Cl.[6] .............................................. G06K 9/38
[52] U.S. Cl. ................................. 382/271; 382/273; 358/465
[58] Field of Search ................. 382/50, 51, 52, 53, 382/18; 358/455, 458, 461, 465; H04N 1/40

[56] References Cited

U.S. PATENT DOCUMENTS

| | | | |
|---|---|---|---|
| 3,983,320 | 9/1976 | Ketcham et al. | 178/6.8 |
| 4,445,138 | 4/1984 | Zwirn et al. | 358/166 |
| 4,695,884 | 9/1987 | Anastassiou et al. | 358/163 |
| 5,063,607 | 11/1991 | FitzHenry et al. | 382/50 |

OTHER PUBLICATIONS

*Digital Image Processsing, A Systems Approach*, William B. Green, Van Nostrand Reinhold Company, Inc. 1983, pp. 50-60.
*Handbook of Pattern Recognition and Image Processing*, Tzay Y. Young and King-Sun Fu, Academic Press, Inc. 1986, pp. 195-197, 213.
*Algorithms for Graphics and Image Processing*, Theo Pavlidis, Computer Science Press, 1982, pp. 50-54.

*Primary Examiner*—David K. Moore
*Assistant Examiner*—Andrew W. Johns
*Attorney, Agent, or Firm*—Woodcock Washburn Kurtz Mackiewicz & Norris

[57] ABSTRACT

A method of picture image processing, and system for carrying out same, involves generation of a composite mapping function, for transforming gray scale values to different values in order to enhance contrast. A reduced range histogram is generated, involving removing a percentage of the total histogram counts from bottom and top sub-ranges and also removing spikes. The reduced histogram is then density averaged in order to obtain a first map function. A second map function is generated for interfacing with the characteristics of the printer to be used, and a composite mapping transform is generated by combining the two generated functions. After the composite mapping function is generated, each gray value of the image data set is transformed in accordance with the composite function, for use in printing, thereby providing an enhanced contrast image.

4 Claims, 8 Drawing Sheets

SYSTEM AND METHOD FOR PICTURE IMAGE PROCESSING EMPLOYING TRANSFORMATION OF PICTURE DATA

This is a continuation, of application Ser. No. 08/052,235, filed Apr. 23, 1993, abandoned, which in turn is a continuation of application Ser. No. 07/728,970, filed Jul. 12, 1991, abandoned.

BACKGROUND OF THE INVENTION

This invention relates to image processing techniques and, in particular, a method and system for enhancing an image which is reproduced by a printer as part of a printed sheet.

There are many applications where electronic image reproduction is desirable or even required. In these applications, it is not infrequent that picture quality is such that enhancement of the picture is necessary prior to reproduction. In such a typical application, a 2" by 2" picture forms part of a larger sheet, containing other printed information. It is very important, in reproducing this sheet, to obtain a picture which is clear for purposes of identification. Thus, image enhancing techniques are required to be incorporated as part of the overall system of generating electronic data representing the sheet, in a form suitable for efficient reproduction. However, where large numbers of sheets must be reproduced, computer processing time must be held down. Thus, there is a need for an improved compromise which provides good enhancement at an acceptable cost in terms of computer processing time.

There are a variety of digital processing and reproduction techniques for enhancing images, known in the art. In some systems, data representing respective gray levels is simply shifted, or transformed, in accord with a predetermined formula. The prior art also shows production of a histogram representation of the gray level image data, and various techniques of operating on the histogram data. Generally, the prior art discloses transforming, or mapping pixels at gray levels where most data points are found, into the wider available range of gray levels. Thus, for example, if gray level data is available between 0 and 255, but most of the data is concentrated in a relative peak between 100 and 150, the information between 100 and 150 may be spread out over the entire range of 0 to 255, in accordance with a linear transform or other transformation formula. Reference is made to the following publications which appear in the technical literature, and which disclose various algorithms and techniques for image processing: *Digital Image Processing, A systems Approach,* William B. Green, Van Nostran Reinhold Company, 1983, pp. 50-60; *Handbook of Pattern Recognition and Image Processing,* Tzay Y. Young and King-Sun Fu, Academic Press, Inc., 1986; and *Algorithms for Graphics and Image Processing,* Theo Pavlidis, Computer Science Press, 1982.

While the prior art shows a variety of image processing techniques, the inventors have found a combination of techniques which provides superior enhancement, particularly for reproducing a picture image as part of a larger form, without excessive processing steps. The method of this invention is generally applicable to picture image processing, and can be used in any system involving reproduction of picture images.

SUMMARY OF THE INVENTION

It is an object of this invention to provide a method for picture image processing which provides an improvement over prior techniques, and which minimizes computer processing time.

In accordance with the object of the invention, there is provided a method and system for reading a portion of the set of gray scale values representing the image and developing a histogram of counts from that portion; performing a range reduction step on the histogram; generating a first mapping transformation based upon the reduced histogram density distribution; and generating a second mapping transformation based upon printer characteristics, which modifies the first function to produce a composite function. The composite mapping transformation is used to effect a single transform of the gray level values prior to printing. In a preferred embodiment, the histogram from which the composite map function is obtained is first altered by reducing spike levels. Additionally, the mapped data is dithered, preferably by averaging the mapped gray levels over a predetermined area and using a predetermined pattern to reproduce such average gray level in such area.

DETAILED DESCRIPTION OF THE PREFERRED EMBODIMENT

Certain terminology is used in the following description for purposes of explanation only, and is not limiting. The word "array" designates a one-dimensional data structure having a number of elements. An element of an "array" is referenced by stating the array name followed by the element number in as a subscript, or brackets. For example, the nth element of a histogram array may be expressed either as HIST[n] or $HIST_n$, where n=0 for the first element. Similarly, the term "VALUE[3]" refers to the fourth element in an array called "VALUE", where n=0 for the first element.

Figure 1:
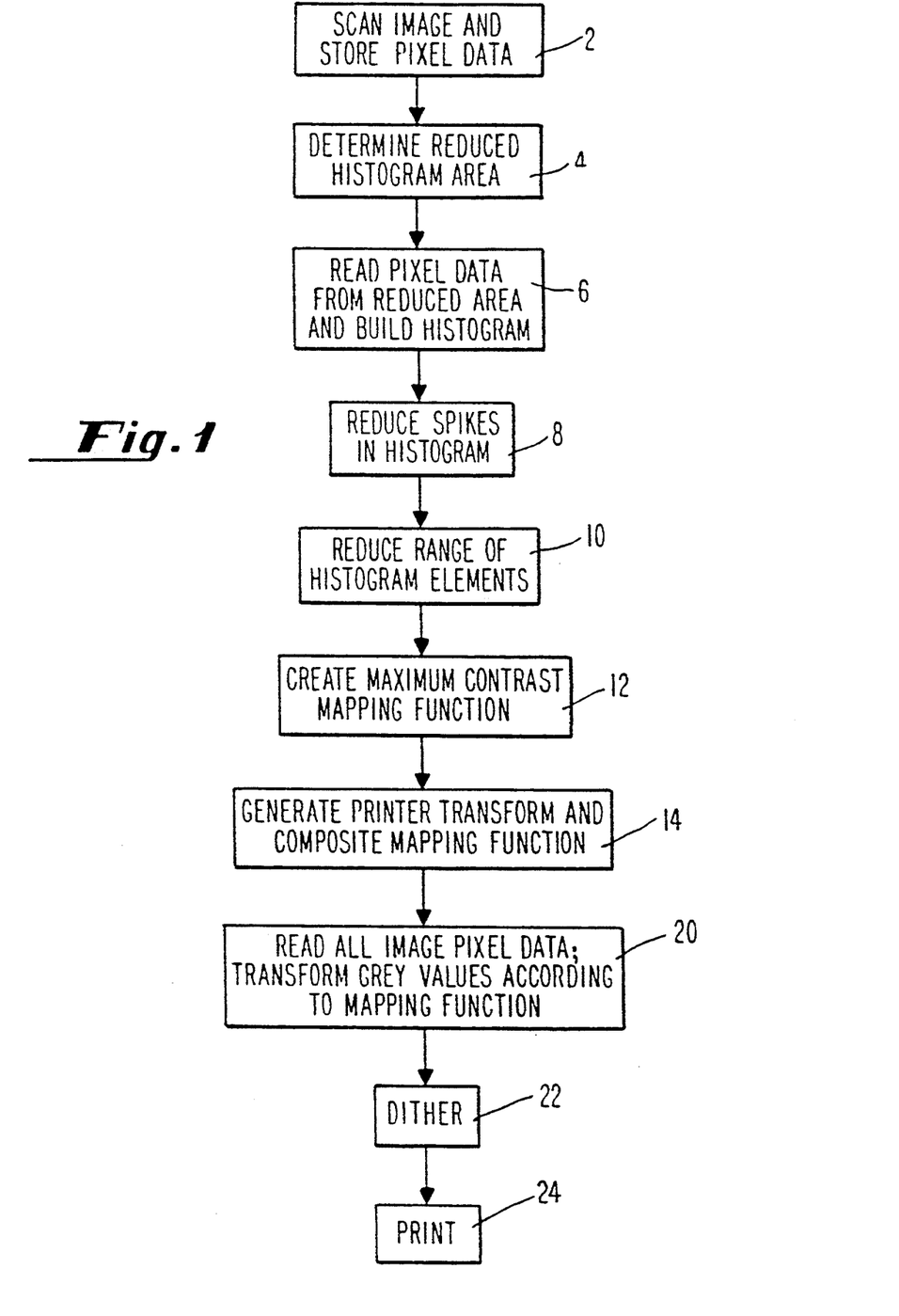
FIG. 1 is a block diagram of the main steps carried out by the system and method of this invention.

Referring now to the drawings wherein like numerals represent like elements, there is shown in FIG. 1 a flow diagram of the overall method of reproducing a contrast-enhanced image. In the initial step 2, an image to be enhanced is scanned using a conventional gray-level electronic scanner of a type well known in the art. The scanned image is stored in memory and comprises a set of data values representative of pixels which make up the image. Each pixel corresponds to a different point in the image and has a grey scale value representative of the relative brightness of that point in the image. In the preferred embodiment, the electronic scanner has a grey level scanning resolution of 256 grey levels, ranging from 0 (black) to 255 (white). Each pixel, therefore, will have a grey scale value ranging from 0 to 255. However, it is understood by those skilled in the art that an electronic scanner having a greater or lower gray-scale resolution may be used. Contrast enhancement is achieved in the present invention by mapping the original grey scale value of each pixel in the scanned image to a different gray scale value according to a mapping function.

Referring again to FIG. 1, in the preferred embodiment, control next passes to block 4 wherein a rectangular region in the center of the scanned image equal to one half the total image area is identified. Thus, for a 2"×2" picture, a center portion of 1.414"×1.414" is identified for use in building a histogram. The grey scale values of the pixels in this reduced region are manipulated in subsequent blocks 6–14 to produce the mapping function. A subset of pixels is used to reduce the processing time of the overall method, and to optimize the center of the picture. It is understood by those skilled in the art, however, that a larger or smaller region of pixels may be selected for processing and the region may be anywhere within the scanned image. Alternatively, the entire set of pixels may be processed.

Control then next passes to block 6 wherein the pixel data in the reduced region is read from memory, and a histogram is generated. In the preferred embodiment, the histogram comprises an array having a number of elements equal to the grey level scanning resolution of the electronic scanner of block 2. Thus, in the preferred embodiment, the histogram consists of 256 elements numbered consecutively from 0 to 255, each element number corresponding to a respective grey scale value. Each element holds a count of the number of pixels in the reduced region having a grey scale value equal to that element number. Thus, for example, if 2000 pixels in the reduced region have a grey scale value of 124, histogram element number 124 ($Hist_{124}$) will hold a count of 2000.

In the preferred embodiment, the count of each histogram element initially is set to zero. To build the histogram, the pixels in the reduced region are consecutively accessed. For each pixel, the grey scale value is inspected and the histogram element corresponding to that grey scale value is incremented. It is understood by those skilled in the art, however, that the histogram may be constructed by any suitable method.

Control next passes consecutively to histogram processing routines 8, 10, 12 and 14 which process the image histogram to produce the composite mapping function. The spike reduction routine 8 reduces the count of a predetermined number of largest histogram element counts to the smallest count of those predetermined element counts. Next, the range reduction routine 10 narrows the range of histogram elements used for generating the mapping function. Range reduction is achieved by defining a lower range of elements and an upper range of elements which each contain a predetermined percentage of the total pixels; and by reducing the count of the elements in those ranges to zero. The resulting reduced range is the remaining range of histogram elements after removal of the lower and upper ranges. Next, maximum contrast routine 12 creates an initial mapping function based upon the histogram with reduced range and spikes removed. The mapping function transforms all original histogram element locations to new element locations, to substantially even out the average density of counts throughout the full (unreduced) histogram range. This density averaging technique enhances the contrast of the picture when it is printed. Finally, the printer mapping routine 14 further maps the histogram elements as a function of a predetermined mathematical formula related to the printer to be used for printing, thereby creating the composite mapping function, which is stored.

Once the composite mapping function is complete, control passes to the grey level transformation routine 20 in which the grey value of each pixel in the scanned image is read and transformed to a different grey value in accordance with the composite mapping function. The mapping function comprises the same number of elements as the original histogram. In the preferred embodiment, therefore, the mapping function comprises 256 elements numbered consecutively from 0 to 255, each element number corresponding to a respective grey scale value. Each element holds a mapping value to which original grey scale values corresponding to that element number will be transformed. For example, if mapping function element 89 holds a mapping value of 123, then every pixel in the scanned image having an original grey scale value of 89 will be transformed to a grey scale value of 123.

In the preferred embodiment, this transformation is performed for each pixel in the scanned image as follows: a pixel is accessed to determine its original grey scale value; the corresponding element in the mapping function is accessed to determine the mapping value; and the original grey scale value is changed to the mapping value. It is understood by those skilled in the art, however, that the grey scale value transformation can be performed in other ways. For example, each element in the mapping function can be selected consecutively, and for each element, the entire set of pixels can be examined, changing the grey scale value of those pixels in the set having an original grey scale value which corresponds to that element. As those skilled in the art will appreciate, this latter method will be appreciably slower than the method of the preferred embodiment.

Once the transformation in block 20 is complete, control passes to block 22 wherein the image is dithered. Dithering is a process well known to those skilled in the art. In the preferred embodiment of this invention, an averaging technique is employed as part of the dithering step. Finally, in block 24, the image is printed using an applicable printer, e.g., an IBM 3827 printer. It is understood by those skilled in the art that the image may be printed on any device suitable for displaying images such as a computer monitor, a laser printer or a dot matrix printer. The printed image, processed in accordance with the method of the present invention, has increased contrast.

Figure 2:
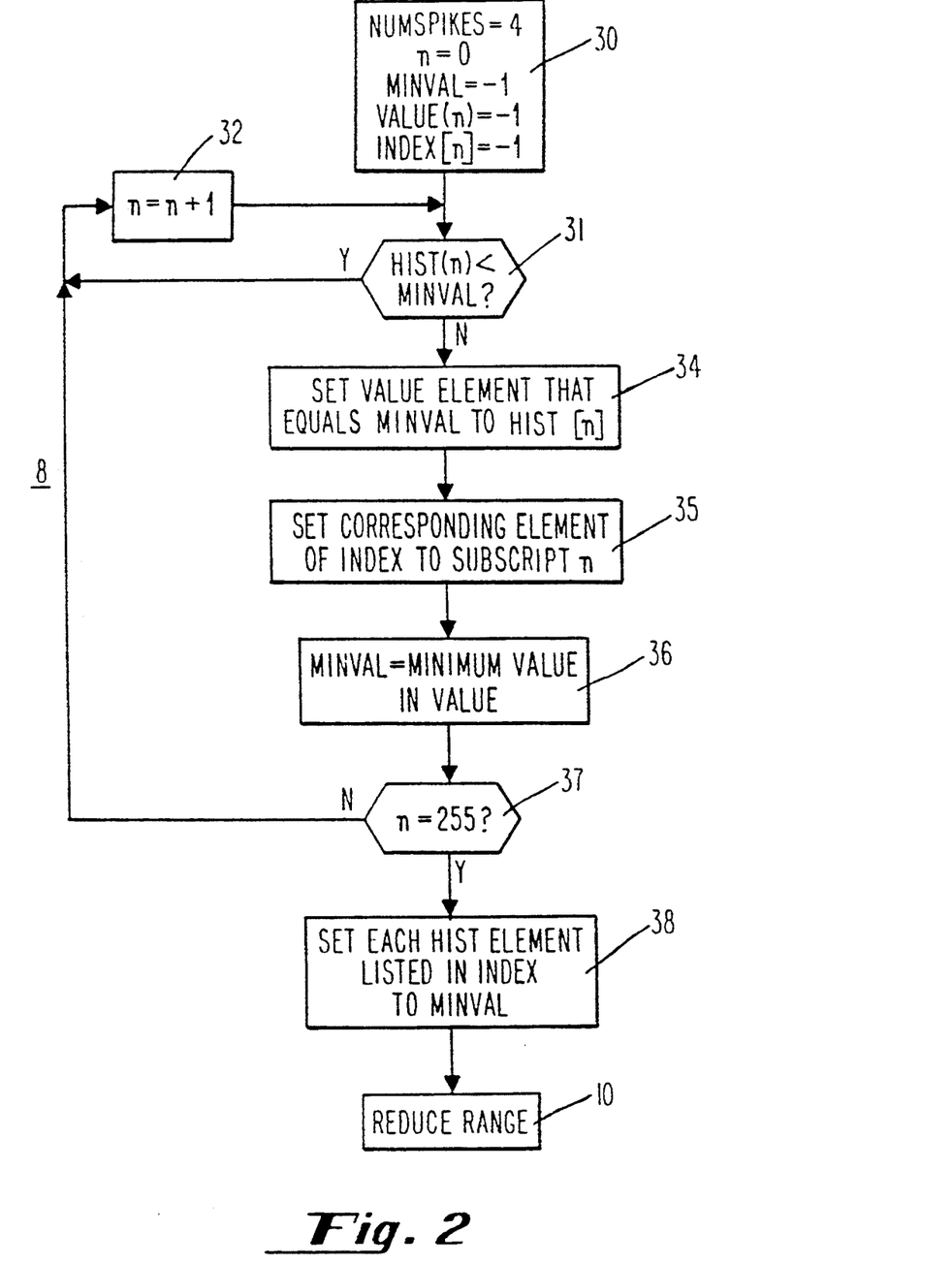
FIG. 2 is a flow diagram illustrating the routine for reducing spikes.

Referring now to FIG. 2, the spike reduction routine 8 is shown in detail. In the drawings, the histogram is indicated by the array variable "HIST." As mentioned above, the spike reduction routine 8 reduces the count of a predetermined number of largest histogram element counts to the smallest count of such determined elements. In the preferred embodiment the predetermined number of largest element counts is 4. It is understood by those skilled in the art, however, that any suitable number less than or greater than 4 may be used. Referring specifically to block 30, data arrays VALUE and INDEX are created, each having 4 data elements, for holding the four largest histogram element counts and their corresponding element numbers respectively. Thus, for example, if VALUE[2] contains one of the four largest histogram counts, then INDEX[2] contains that count's histogram element number. Also at block 30, a variable MINVAL is created for holding the smallest of the four element counts in VALUE. The number of spikes, NUMSPIKES, is also entered.

At 31, it is determined whether HIST[n] is less than MINVAL. Initially, since MINVAL is set equal to −1, the count of the first element must be less than MINVAL, in which case the program proceeds to execute the function set out at block 34. If, on a subsequent loop, HIST[n] is less than MINVAL, the program branches to block 32, increases n by 1, and returns to 31. At 34, the program finds the value element that equals MINVAL, and sets it to the count of HIST[n]. This requires a sub-loop for searching the VALUE array to find MINVAL, and then replacing that value element with the count of HIST[n]. Then, at block 35, the corresponding element of index is set to subscript n, i.e., the element of the histogram (HIST[n]) being examined. Although these functions can be performed in any desired way, in a preferred embodiment, the program loops through the elements of VALUE to find the element equal to MINVAL, and sets the corresponding element of VALUE equal to the count of HIST[n], and sets the corresponding element of INDEX to n. Following this, at block 36, MINVAL is set equal to the new minimum count in VALUE. This is done by looping through the VALUE array to find the smallest count. Such looping to determine MINVAL is also done by establishing a loop value and successively incrementing such loop value up to NUMSPIKES, finding the minimum value and comparing each count of VALUE to the previously found minimum value, each time resetting MINVAL to the count of the new minimum thus found. After this, as shown at block 37, the value n of the histogram element is checked to see if it is up to 255, and if no, the program loops back to 32 where n is incremented by 1, and another loop of blocks 31, 34, 35 and 36 is performed. After n reaches 255 (meaning all 256 histogram elements have been run through), the program goes to block 38, where each histogram element listed in INDEX is set to MINVAL. This constitutes taking each of the histogram elements as identified at the last pass of block 35, and replacing its count with the value of MINVAL established at the last pass of block 36. Following this, the routine exists to the next routine, Reduce Range.

Figure 3A:
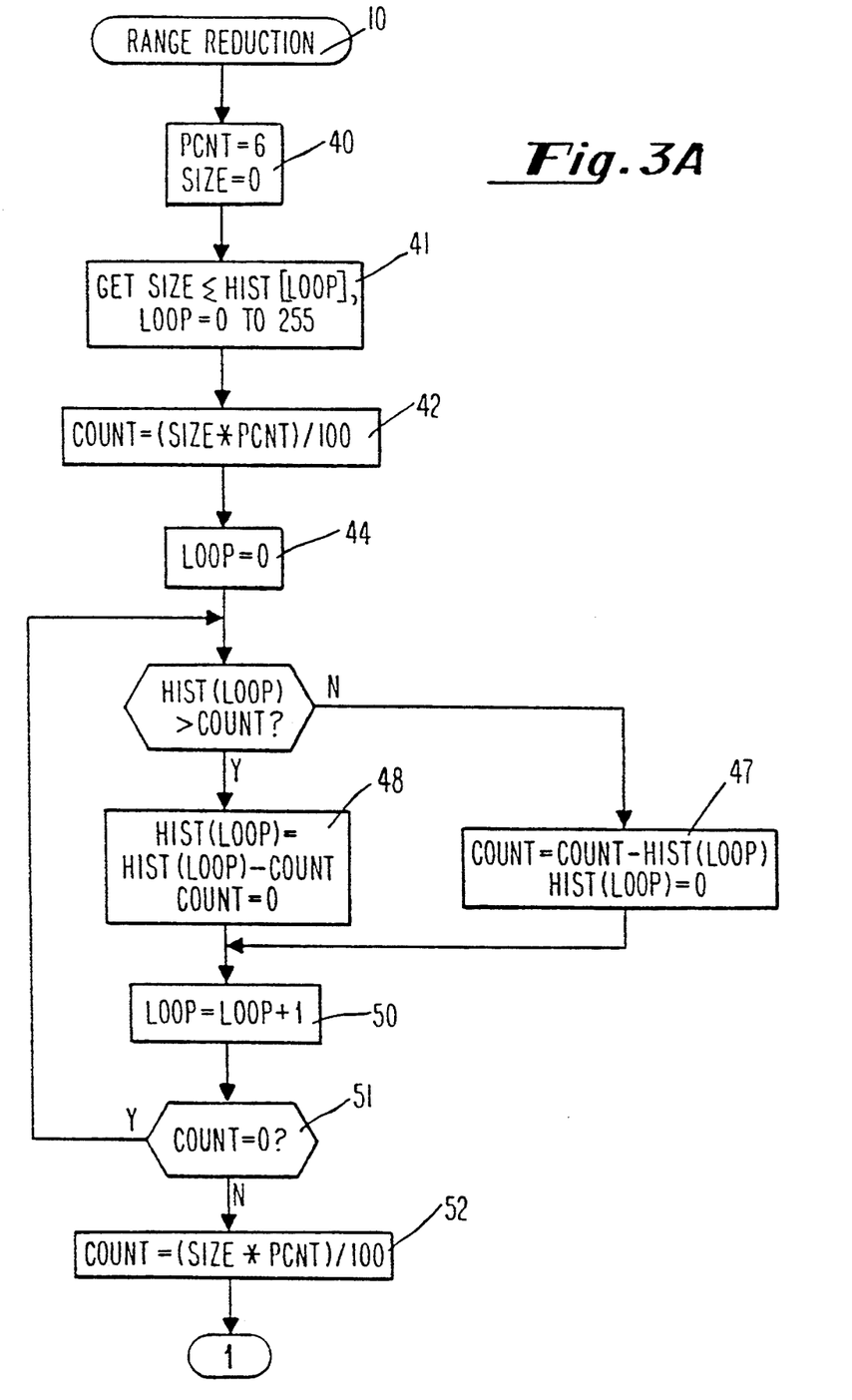
FIGS. 3A and 3B combined represent a flow diagram illustrating the routine for reducing range in accordance with this invention.
Figure 3B:
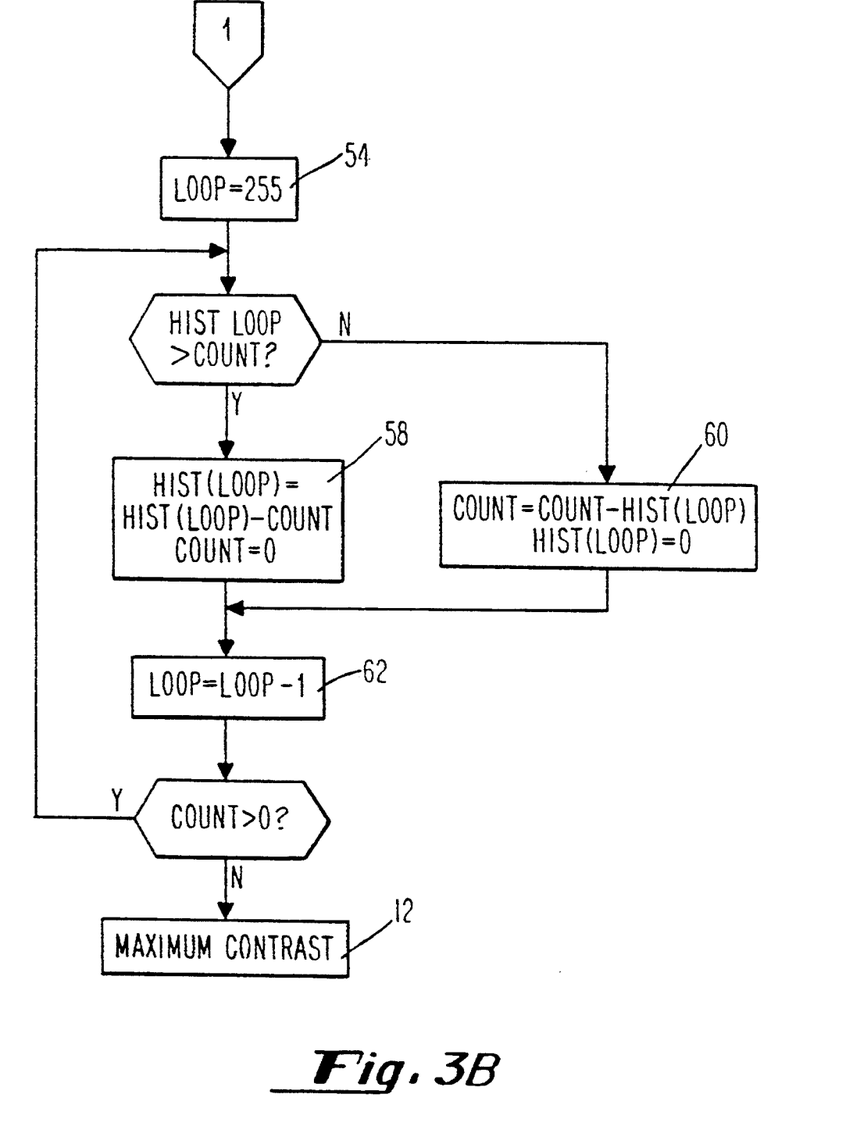

Referring now to FIG. 3, the range reduction routine is shown in detail. As mentioned above, the range reduction routine 8 reduces the range of histogram elements to be used for generating the mapping function. To reduce the overall range of the histogram, a lower range of elements and an upper range of elements are defined. These ranges are defined such that the sum of the original element counts in each of the lower and upper ranges is equal to a predetermined percentage of the total original histogram count, e.g., 6%. The histogram elements in the upper and lower ranges are effectively removed from the overall range of the histogram by setting the counts in these elements to 0, thereby generating a reduced range. This step is a prelude to the next step where the counts from the reduced range are spread substantially evenly over the entire range in the course of generating the mapping function. By this technique, a map is developed whereby more gray values get shifted toward the extreme limits (black and white), which results in greater contrast.

Referring again to FIG. 3, the range reduction process is discussed in detail. Upon entering the range reduction routine, control passes to block 40 which defines two variables, PCNT and SIZE. PCNT contains the predetermined percentage. While the preferred percentage is 6, it is to be understood by those skilled in the art that any percentage can be used. Control next passes to block 41 which sums the counts in each element of the histogram to determine the total histogram count, stored as SIZE. Control then passes to block 42 which applies the predetermined percentage to the total histogram count to determine a count value for defining the upper and lower element ranges. This count value is stored in COUNT. Thus, $$COUNT=(SIZE*PCNT)/100$$

The remainder of the range reduction routine is best illustrated in conjunction with an example. Thus, suppose that the total histogram count after spike reduction is 100,000 (i.e. SIZE=100,000) and that HIST[0] contains a count of 2000, HIST[1] contains a count of 1,500, HIST[2] contains a count of 1,500, and HIST[3] contains a count of 2000. With a predetermined percentage of 6%, COUNT contains a count of 6000 (i.e. 6% of 100,000). The value in COUNT, 6000, is used to define an upper and lower range of elements wherein the sum of the element counts in each range is equal to 6000. In the example, therefore, the lower range comprises HIST[0], HIST[1], HIST[2] and one-half of HIST[3]. As described above, the counts in these elements are to be reduced to zero or decremented, to generate a reduced range histogram.

Referring to blocks 44 through 52, a program loop is shown that performs the effective removal of 6% of counts from the lower range of elements. In the first iteration, HIST[0] is compared to COUNT in block 46. Since HIST[0] is less than COUNT, control passes to block 47 where the count in HIST[0] is subtracted from COUNT and HIST[0] is set to 0. COUNT now contains 4000. The loop counter is then incremented in block 50, and in block 51, COUNT is compared to zero to determine whether all the elements of the lower range have been removed. Since COUNT contains 4000, control passes again to block 46 where the next element (HIST[1]), is compared to COUNT. Both HIST[1] and HIST[2] will be processed in the same manner as HIST[0]. After HIST[2] has been processed, COUNT =1000. On the fourth iteration, HIST[3] is compared to COUNT and because the value of HIST[3] is greater than COUNT, control passes to block 48. In block 48, COUNT is subtracted from HIST[3], and HIST[3] is set to 1000; COUNT is set to 0. Control then passes through block 50 to block 51. Because COUNT now equals 0, control passes to block 52 where COUNT is recalculated to 6000 as was done previously in block 41.

Control then passes to blocks 54 through 64 which comprise a loop similar to that of blocks 40 through 52. This loop performs the same process on the upper range of elements. The loop operates initially on element 255 and works backwards until, as in the description above, COUNT equals 0. As illustrated, HIST[loop] is compared to COUNT at 56. As long as it is greater than COUNT, the program branches to 60 where COUNT is decrement by HIST[loop], and HIST[loop] is set equal to 0. Loop is decremented at 62, and as long as COUNT is greater than 0, the program branches at 64 back to block 56. When HIST[loop] is greater than COUNT, HIST[loop] is decremented by COUNT at block 58, and COUNT is set equal to 0. The loop is then exited at 64, since the histogram range reduction is complete.

Figure 4A:
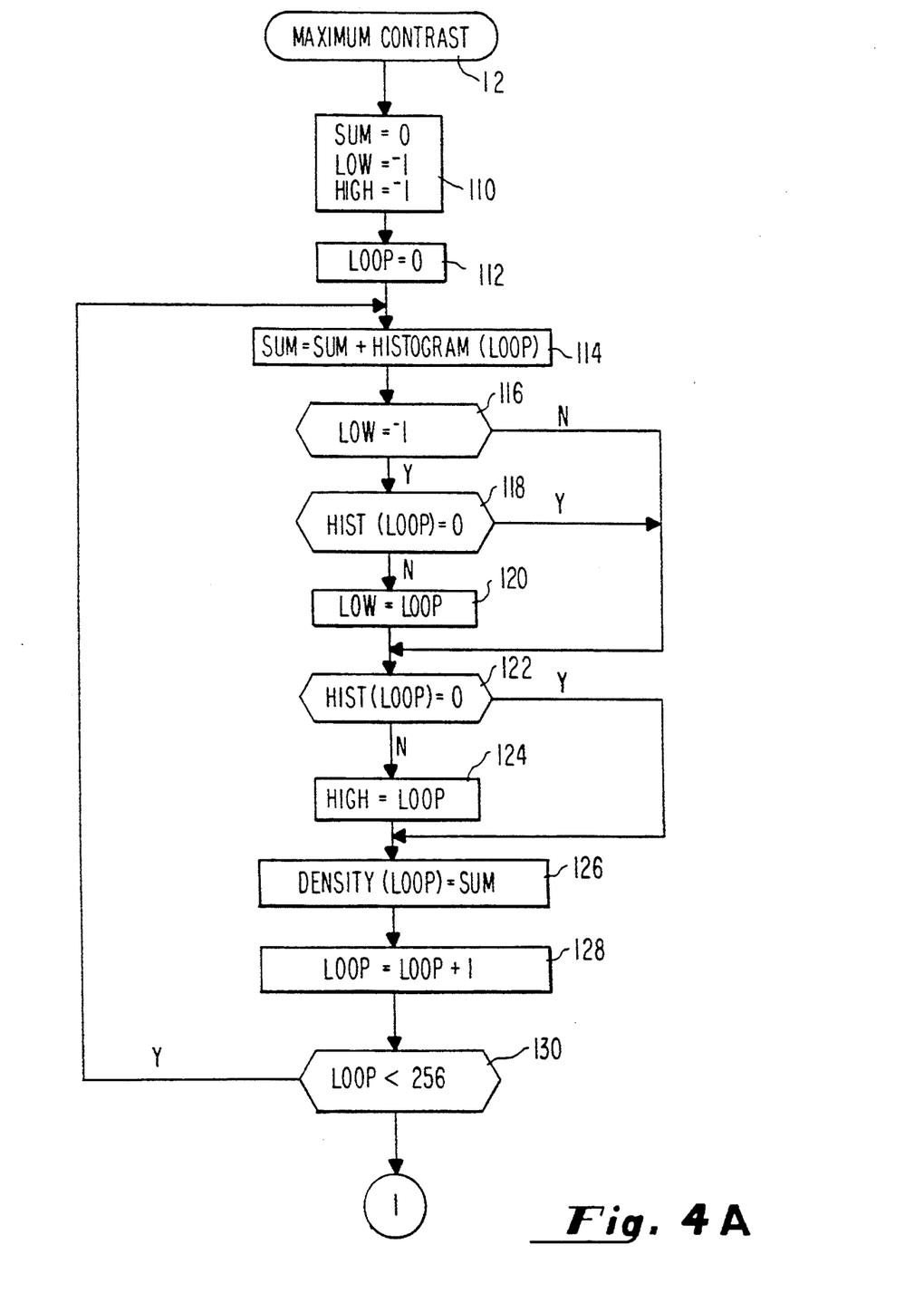
FIGS. 4A, 4B and 4C combined illustrate a flow diagram for maximum contrast mapping in accordance this invention.
Figure 4B:
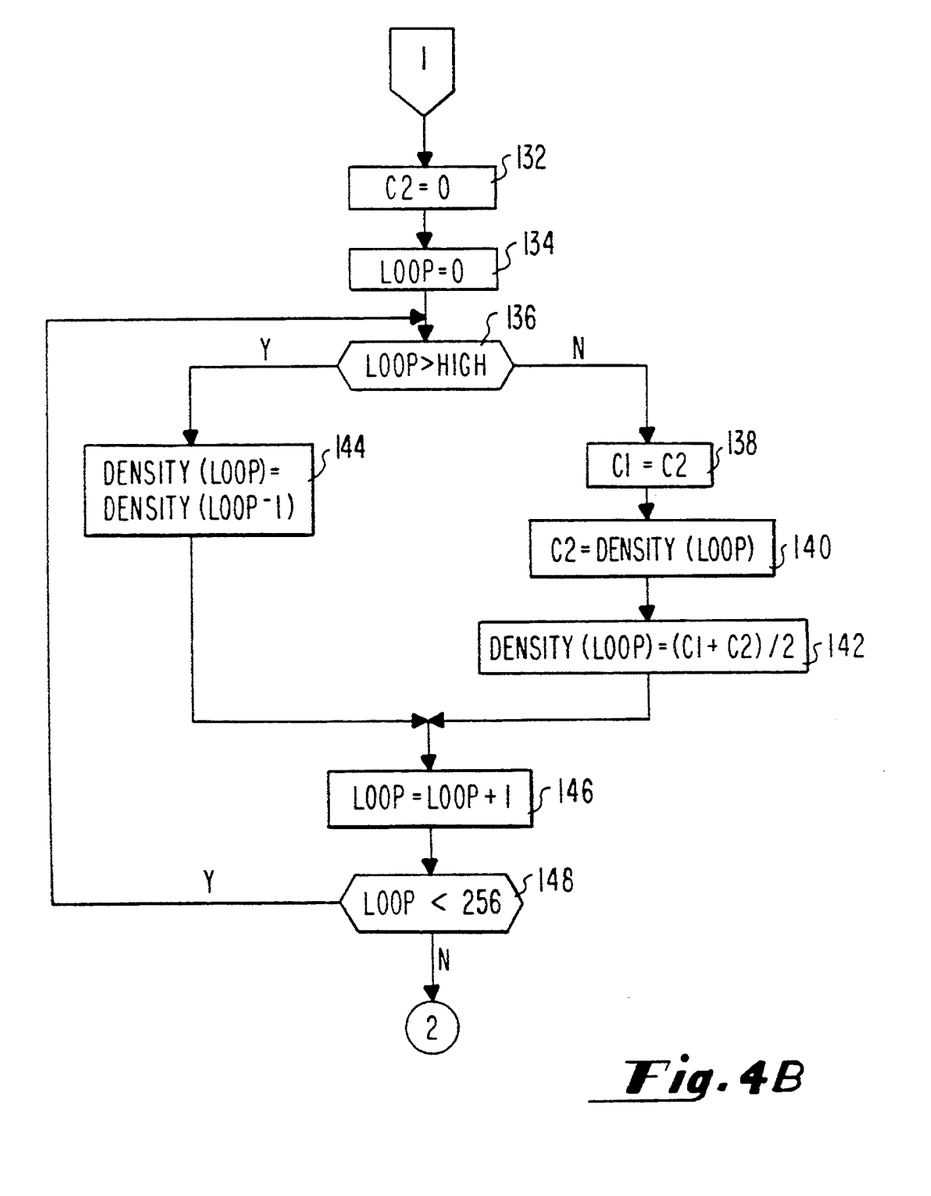
Figure 4C:
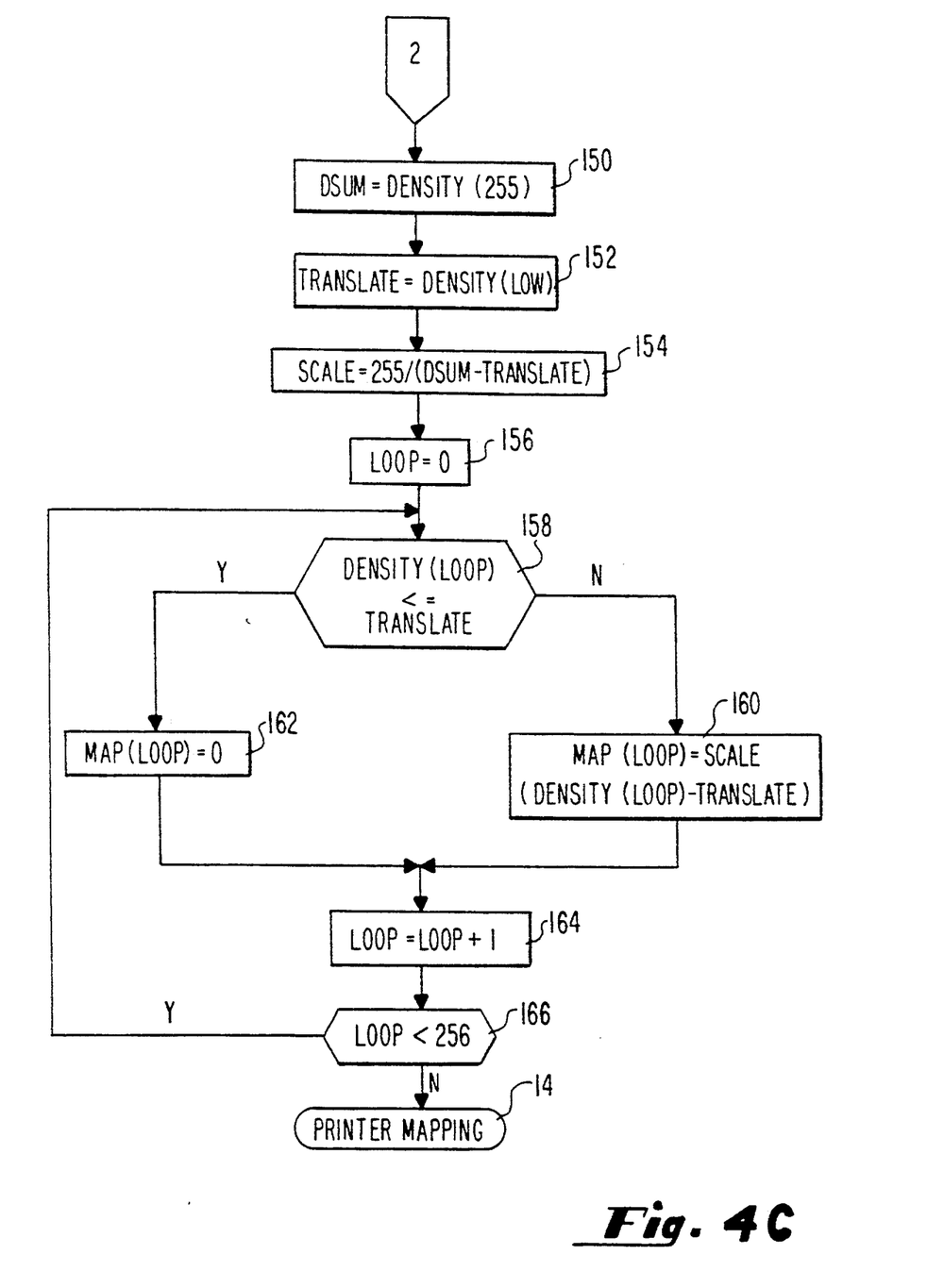

Control then next passes to the maximum contrast routine 12, where the histogram, having reduced spikes and a reduced range, is further manipulated to produce an initial mapping function. Referring now to FIGS. 4A, 4B and 4C, the maximum contrast routine 12 is shown in detail. The maximum contrast routine 12 creates an initial mapping function for mapping original histogram element locations to different element locations to substantially even out the average density of counts in the reduced range of the histogram. Referring to the figure, control passes to block 110 which defines variables SUM, LOW and HIGH and initializes them to values of 0, −1 and −1 respectively. The variable SUM will represent the summation of counts for reduced histogram elements 0 through n; LOW represents the lowest histogram element having a non-zero count; and HIGH represents the highest histogram element having a non-zero count. Control then next passes to blocks 112 through 130 which define a program loop that determines the values of LOW and HIGH. The loop defined by blocks 112 through 130 also produces an array called DENSITY comprising the same number of elements as the histogram, which in the preferred embodiment is 256 elements. Each element number in the DENSITY array corresponds to the same element number in the histogram. Each element in the density array contains a value equal to the sum of the histogram element counts from element 0 to that element. Thus, the value in element N of the density array (i.e. DENSITY[N]) can be described as follows:

$$\text{DENSITY}[N] = \Sigma \text{HIST}[n], \text{ for } n=0 \text{ to } n=N.$$

Referring specifically to FIG. 4A, at block 112 a loop variable is set equal to 0. At block 114, a new sum is calculated as the summation of the prior value of SUM plus the histogram count for the element being examined, i.e., HISTOGRAM[loop]. At block 116, it is determined whether LOW is set equal to −1, which is its initialized value. If yes, which is the case until an element with a non-zero count is examined, the program goes to 118, where it is determined whether HISTOGRAM[loop] is equal to 0. If yes, the program branches to block 122. If no, meaning that a non-zero histogram count has been encountered, then at block 120 the value of LOW is set equal to LOOP. At block 122, it is again determined whether HISTOGRAM[loop] equals 0. If no, at 124 HIGH is set equal to LOOP. Note that each time the program passes through the loop 114–130, HIGH will be set equal to LOOP until HISTOGRAM[loop] is determined to be 0 at 122. This indicates that the value of HIGH set during the last loop is the value to be retained; and accordingly the program then skips block 124 and goes to block 126. DENSITY[loop] is updated to SUM at 126, and then the loop variable is incremented by 1 at block 128. At block 130, it is determined whether loop is less than 256; if yes, the program loops through blocks 114–128 again; if no, it continues on.

Referring to FIG. 4B, control next passes to blocks 132 through 148 which define a program loop that averages each DENSITY element below HIGH with its immediately preceding neighbor. Thus for n=0 to HIGH, $$\text{DENSITY}[n] = (\text{DENSITY}[n] + \text{DENSITY}[n-1])/2.$$

Elements above HIGH, which after range reduction contain counts of zero, are each assigned the count in DENSITY[HIGH]. Thus, for n=(HIGH+1) to 255, $$\text{DENSITY}[n] = \text{DENSITY}[\text{HIGH}].$$

Specifically, at block 132 a variable C2 is set equal to 0, and the variable loop is set equal to 0 at 134. At 136, it is determined whether LOOP is greater than HIGH. If no, the variable C1 (which represents DENSITY[n−1] is set equal to C2 at 138. At 140, C2 is set equal to DENSITY[loop], and at 142 DENSITY[loop] is set equal to (C1+C2)/2, meaning that the value of DENSITY[n] is set equal to the average of DENSITY for n and (n−1). Following this, LOOP is incremented by 1 at 146, and at 148 if LOOP is less than 256, the program goes back to block 136. The program continues to LOOP through 136–148 until LOOP is found to be greater than HIGH, whereupon DENSITY[loop] is set equal to DENSITY[loop −1] at 144.

After LOOP is determined to be not less than 256 (i.e., it has reached the count of 256), control passes to blocks 150 through 154 which determine roughly the average number of counts per histogram element and store the inverse of that average in a variable called SCALE. Control next passes to blocks 156 through 166 which define a program loop that creates the mapping function array, referred to as MAP, having 256 elements. Each element of MAP corresponds to the respective element of HIST and DENSITY. Each element of map contains a value equal to the count in the respective element of DENSITY less the density [low] count, multiplied by SCALE. Thus for n=0 to 255, $$\text{MAP}[n] = (\text{DENSITY}[n] - \text{density}[\text{low}]) * \text{SCALE}.$$

Referring specifically to FIG. 4C, at block 150 dsum is set equal to DENSITY[255], which represents the summation of all counts in the reduced histogram. At block 152, the variable translate is set equal to DENSITY[low]. At block 154, the variable scale is defined as 255/(dsum−translate), such that scale represents the fraction of the total number of map elements divided by the density difference between density at the last element and density at the low element. SCALE is used as a multiplier in determining map elements. At 156, LOOP is set equal to 0, and at 158 DENSITY[loop] is compared to see whether it is less than or equal to translate. If yes, which is the condition for LOOP less than or equal to LOW, the program branches to block 162 where MAP[loop] is set equal to 0. Thus, all elements up to and including LOW are mapped to 0. At block 164, LOOP is incremented by 1, and compared to see whether it is less than 256 (at 166). If yes, the program recycles and again compares DENSITY[loop] to translate at 158. When the loop variable passes LOW, such that DENSITY[loop] becomes greater than DENSITY[low], the program passes to block 160, where the transformation is performed. Note that SCALE is multiplied by the density differential between density at the element being examined and density at the low element, providing the element (between 0 and 255) which corresponds to averaging density up to that point. Note that after loop variable passes HIGH, there is no change in the calculation at block 160, since DENSITY[loop] is unchanged up to element 255.

Each element of MAP holds a value ranging from 0 to 255, thereby defining a mapping function for mapping the counts in original histogram element locations to different element locations to substantially even out the average density of counts in the reduced range of the histogram. Thus if the following transformation is performed for n=0 to 255:

HIST[n] → HIST[MAP[n]], the resulting histogram will have a substantially uniform average density of counts over its entire range. Histograms with such uniform average density represent images having high contrast. Note that the mapping function is not actually applied to map the counts in original element locations to different element locations. Instead, because histogram element locations correspond to the respective gray scale values of pixels in the scanned image, MAP is used to transform the grey scale value of each pixel to a different value resulting in an image having increased contrast. For example, a pixel having a grey scale value of N will be transformed by changing its grey scale value to MAP[N]. Transforming the grey scale values in this manner produces an image having increased contrast.

Before the grey scale transformation is performed, however, the values in MAP are further manipulated by the printer mapping routine 14. This routine further manipulates the values in MAP as a function of a predetermined mathematical formula related to the printer to be used for printing the enhanced image. In the preferred embodiment, the printer to be used is the IBM 3827 printer; however, as discussed above, any suitable printing device may be employed. The mathematical formula chosen for use with the IBM 3827 printer appears below:

$y = a*x^n$ where, in the preferred embodiment,
    $n = \log(147/255)/\log(127.5/255)$; and
    $a = 255^{(1-n)}$.

It is understood by those skilled in the art that for different printing devices, the parameters of the formula above may be altered. Alternatively, a different formula may be used.

The printer mapping routine 14 utilizes a program loop which applies the mathematical transformation above to each element of MAP, in a manner similar to the loops illustrated in FIGS. 4A–4D. Thus, for t=0 to 255, $MAP[t] = a*(MAP[t])^n$.

This manipulation alters the values in MAP such that a lighter or darker image, as needed, will be produced when the image is printed. When the loop has completed, control passes to block 20, described previously, wherein the grey scale values of each pixel of the scanned image are transformed in accordance with the mapping function defined by MAP.

From the foregoing description, it can be seen that the present invention is directed to a method of reproducing a contrast-enhanced image. It will be appreciated by those skilled in the art, that changes could be made to the embodiment described above without departing from the broad inventive concepts thereof. It is understood, therefore, that this invention is not limited to the particular embodiment disclosed, but is intended to cover all modifications which are within the scope and spirit of the invention as defined by the appended claims. The method of this invention provides for sophisticated enhancement processing, without excessive computer time. Thus, one-half of the pixels are read from memory a first time, and processed in the course of generating the composite mapping function. All of the pixels are read at the second reading, following which a single composite transform is carried out, to generate the final data set representative of the enhanced image.

Figure 5:
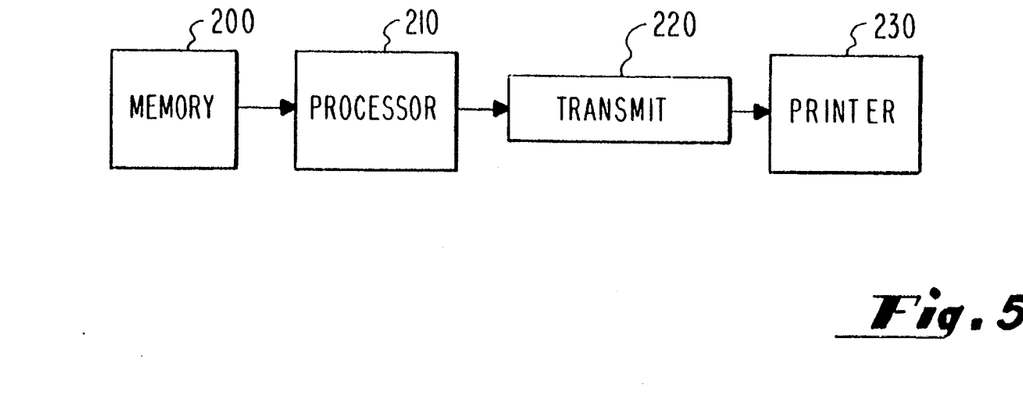
FIG. 5 is a block diagram of the primary system components of the invention.

There is thus described a method and system for picture image processing. The method can be carried out with any suitable commercially available equipment, as illustrated in FIG. 5. Thus, the original picture data representing gray values of pixels is stored in memory 200, and the process steps of FIGS. 2–4 are carried out in a processor 210, which contains suitable buffer storage. The processed data is transmitted over a transmit system, 220, which may be a simple cable or any more complex transmission path, to a printer 230 which is located at a nearby or remote location. Of course, as is known in the art, the processed image data can be encoded for transmission purposes, and decoded at the receiving location. Likewise, any portion of the image processing can be done at a first location, with the remainder done at the receiving location. Thus, the second mapping function, for the printer, can be carried out remotely, and adapted for respective different printers.

What is claimed:

1. A picture reproduction method, comprising the steps of:
    scanning a picture in a gray level electronic scanner, the scanner providing a set of gray scale values representative of the picture, and storing the set of gray scale values in a memory, the gray scale values having n levels;
    identifying a portion of the picture to be used to generate an initial histogram, where a subset of the stored set of gray scale values corresponds to the identified portion of the picture;
    reading the subset of the stored set of gray values from memory and building therefrom the initial histogram having a range of n elements, the range having a lowest element and a highest element, each respective element having a count of the number of gray scale values in the portion corresponding to a respective one of the n levels;
    reducing spikes in the initial histogram by reducing the count of a predetermined number of elements having the largest counts to the smallest count of the predetermined number of elements;
    determining a lower range of the initial histogram having a predetermined percentage of the total count of the subset, an upper range of the initial histogram having the predetermined percentage of the total count of the subset, and a reduced range histogram comprising elements between the lower and upper ranges;
    generating a composite map from a first and second mapping and storing the composite map in memory, the first mapping including:
        mapping elements in the lower range to the lowest range element, and mapping elements in the higher range to the highest range element; and
        mapping the elements in the reduced range to respective first mapped element locations throughout the range in accordance with the average density of counts of the reduced range histogram; and, the second mapping including mapping the first mapped elements to new second mapped elements throughout the range as a function of characteristics of a printer; reading the set of gray scale values from memory and transforming each gray scale value in the set in accordance with the stored composite map;

dithering the transformed gray scale values; and, printing the picture on the printer as a function of the dithered transformed gray scale values.

2. A picture reproduction system, comprising:

a memory;

a gray level electronic scanner for scanning a picture and providing, from the scanning, a set of pixels representative of the picture, each of the pixels having one of n gray scale values;

means for storing the pixels provided by the scanner in the memory of the system;

means for identifying a portion of the picture to be used to generate an initial histogram, where a subset of the stored set of pixels corresponds to the identified portion of the picture means for reading the gray scale values of the subset of the stored pixels from the memory and developing therefrom a histogram having a range of n respective elements numbered consecutively from 0 to n−1, each of the elements corresponding to a respective one of the gray scale values, each the element containing a count of all pixels in the subset having such value;

means for reducing spikes in the histogram by reducing the count of a predetermined number elements having the largest counts to the smallest count of the predetermined number of elements;

means for defining a lower range of histogram elements having a predetermined percentage of the total count of the subset, and an upper range of histogram elements having the predetermined percentage of the total count of the subset and for removing the predetermined percentage of the total count from the lower and upper ranges, thereby to reduce the overall range of element counts in the histogram;

means for generating a first mapping function for transforming original histogram element numbers to new histogram element numbers wherein the element numbers in the lower range are mapped to the lowest element number of the range, the element numbers in the upper range are mapped to the highest element number of the range, and the element numbers in the reduced range are mapped to other element numbers in the range as a function of the average density of element counts within the range;

means for generating a second composite mapping function from the first mapping function in accordance with characteristics of a printer;

means for reading the gray scale values of the set of pixels from memory and transforming the gray scale values in accordance with the second composite mapping function;

means for dithering the transformed gray scale values of the pixels, the printer printing the picture as a function of the dithered transformed gray scale values of the pixels.

3. A picture reproduction method, comprising the steps of:

scanning a picture in a gray level electronic scanner, the scanner providing a set of gray scale values representative of the picture, and storing the set of gray scale values in a memory, the gray scale values having n levels;

identifying a portion of the picture to be used to generate an initial histogram, where a subset of the stored set of gray scale values corresponds to the identified portion of the picture;

reading the subset of the stored set of gray values from memory and building therefrom the initial histogram having a range of n elements, the range having a lowest element and a highest element, each respective element having a count of the number of gray scale values in the portion corresponding to a respective one of the n levels;

reducing spikes in the initial histogram by reducing the count of a predetermined number of elements having the largest counts to the smallest count of the predetermined number of elements;

determining a lower range of the initial histogram having a predetermined percentage of the total count of the subset, an upper range of the initial histogram having the predetermined percentage of the total count of the subset, and a reduced range histogram comprising elements between the lower and upper ranges;

generating a composite map from a first and second mapping and storing the composite map in memory, the first mapping including:

mapping elements in the lower range to the lowest range element, and mapping elements in the higher range to the highest range element; and mapping the elements in the reduced range to respective first mapped element locations throughout the range in accordance with the average density of counts of the reduced range histogram; and, the second mapping including mapping the first mapped elements to new second mapped elements throughout the range as a function of characteristics of a display device;

reading the set of gray scale values from memory and transforming each gray scale value in the set in accordance with the stored composite map;

dithering the transformed gray scale values; and, displaying the picture on the display device as a function of the dithered transformed gray scale values.

4. A picture reproduction system, comprising:

a memory;

a gray level electronic scanner for scanning a picture and providing, from the scanning, a set of pixels representative of the picture, each of the pixels having one of n gray scale values;

means for storing the pixels provided by the scanner in the memory of the system;

means for identifying a portion of the picture to be used to generate an initial histogram, where a subset of the stored set of pixels corresponds to the identified portion of the picture means for reading the gray scale values of the subset of the stored pixels from the memory and developing therefrom a histogram having a range of n respective elements numbered consecutively from 0 to n−1, each of the elements corresponding to a respective one of the gray scale values, each the element containing a count of all pixels in the subset having such value;

means for reducing spikes in the histogram by reducing the count of a predetermined number elements having the largest counts to the smallest count of the predetermined number of elements;

means for defining a lower range of histogram elements having a predetermined percentage of the total count of the subset, and an upper range of histogram elements having the predetermined percentage of the total count of the subset and for removing the predetermined percentage of the total count from the lower and upper ranges, thereby to reduce the overall range of element counts in the histogram;

means for generating a first mapping function for transforming original histogram element numbers to new histogram element numbers wherein the element numbers in the lower range are mapped to the lowest element number of the range, the element numbers in the upper range are mapped to the highest element number of the range, and the element numbers in the reduced range are mapped to other element numbers in the range as a function of the average density of element counts within the range;

means for generating a second composite mapping function from the first mapping function in accordance with characteristics of a display device;

means for reading the gray scale values of the set of pixels from memory and transforming the gray scale values in accordance with the second composite mapping function;

means for dithering the transformed gray scale values of the pixels, the display device displaying the picture as a function of the dithered transformed gray scale values of the pixels.

* * * * *